United States Patent [19]

Lee

[11] 4,408,000

[45] Oct. 4, 1983

[54] COMPOSITIONS COMPRISING THERMOPLASTIC RESIN, MOLD RELEASE AGENT AND LONG CHAINED FATTY ACID

[75] Inventor: Garland G. Lee, Mt. Vernon, Ind.

[73] Assignee: General Electric Company, Mt. Vernon, Ind.

[21] Appl. No.: 327,947

[22] Filed: Dec. 7, 1981

Related U.S. Application Data

[63] Continuation-in-part of Ser. No. 273,589, Jun. 15, 1981.

[51] Int. Cl.³ .......................... C08K 5/09; C08K 5/10; C08L 69/00; C08L 91/06
[52] U.S. Cl. ..................................... 524/315; 524/300; 524/311; 524/318; 524/322; 524/565; 524/575; 524/601; 524/606; 524/609; 524/611
[58] Field of Search ............... 524/611, 322, 311, 315, 524/318, 300, 575, 565, 601, 606, 609, 611

[56] References Cited

U.S. PATENT DOCUMENTS

| | | | |
|---|---|---|---|
| 3,186,961 | 6/1965 | Sears et al. ........................ | 524/114 |
| 3,265,648 | 8/1966 | Boor et al. ........................ | 524/322 |
| 3,355,404 | 11/1967 | Ruffing et al. ..................... | 524/322 |
| 3,402,135 | 9/1968 | Schwartz et al. ................... | 524/322 |
| 3,403,118 | 9/1968 | Listner ............................. | 524/322 |
| 3,444,115 | 5/1969 | Needham et al. ................... | 524/322 |
| 3,492,257 | 1/1970 | Meyer et al. ....................... | 524/322 |
| 3,493,537 | 2/1970 | Salyer et al. ....................... | 524/322 |
| 3,511,793 | 5/1970 | Ezell ................................. | 524/322 |
| 3,784,595 | 1/1974 | Schirmer et al. ................... | 524/611 |
| 3,836,499 | 9/1974 | Schirmer et al. ................... | 524/611 |
| 3,905,927 | 9/1975 | Anderson et al. .................. | 524/322 |
| 3,951,903 | 4/1976 | Shaffer .............................. | 524/611 |
| 3,953,387 | 4/1976 | Wolgemuth et al. ............... | 524/322 |
| 4,010,128 | 3/1977 | Saggese et al. ..................... | 524/322 |
| 4,065,436 | 12/1977 | Adelmann et al. ................. | 525/462 |
| 4,077,939 | 3/1978 | Paparatto et al. .................. | 524/322 |
| 4,082,715 | 4/1978 | Mercier ............................. | 524/295 |
| 4,097,435 | 6/1978 | Rawlings et al. ................... | 524/277 |
| 4,111,861 | 9/1978 | Godlewski ......................... | 524/611 |
| 4,131,575 | 12/1978 | Adelmann et al. ................. | 524/311 |
| 4,180,490 | 12/1979 | MacLean ........................... | 524/322 |
| 4,302,378 | 11/1981 | Lindner et al. .................... | 524/322 |

FOREIGN PATENT DOCUMENTS

| | | |
|---|---|---|
| 47-41092 | 10/1972 | Japan . |
| 54-16559 | 2/1979 | Japan . |
| 54-76651 | 6/1979 | Japan . |
| 56045-944 | 9/1979 | Japan . |
| 55-84353 | 6/1980 | Japan . |

*Primary Examiner*—Ronald W. Griffin
*Attorney, Agent, or Firm*—Martin B. Barancik

[57] ABSTRACT

A composition comprising a thermoplastic resin, a mold release agent and a mold release enhancing effective amount of a fatty acid.

18 Claims, No Drawings

COMPOSITIONS COMPRISING THERMOPLASTIC RESIN, MOLD RELEASE AGENT AND LONG CHAINED FATTY ACID

This patent application is a continuation-in-part of co-pending application Ser. No. 273,589 filed June 15, 1981, which is herein incorporated by reference.

BACKGROUND OF THE INVENTION

Useful articles from various thermoplastic resins have been prepared from molds for many years. Injection molding provides a convenient way for preparing various articles from thermoplastic resins, particularly objects of a relatively intricate nature. In order to injection mold articles in an economic manner the mold resident cycle time should be kept to a minimum. This shorter cycle time provides a shorter resin heat period with consequently less thermal damage to the resin itself and/or less thermal promoted interaction between the resin and various additives present in the resin. In order to accomplish a release of the resin from the mold, various mold release agents have been found which provide for a release of the resin with lower ejection pressure. Such an agent should be chemically compatible with the resin as measured by the usual characteristics of the resin under normal conditions and heat treatments.

Of the thermoplastic resins which find a mold release agent useful from time to time one of the most sensitive to chemical interaction are the polycarbonates. The carbonate bond is susceptible to bond cleavage, for example, hydrolysis from the usual sources. Therefore, the particular mold release agent in the past has been substantially neutral.

A series of patents and publications disclosing the use of carboxylic acid esters and paraffin waxes as mold release agents for polycarbonates are known.

U.S. Pat. No. 3,836,499—polycarbonate molding compositions having as a mold release additive an ester of a saturated aliphatic long chain monocarboxylic acid and a univalent aliphatic long chain alcohol.

U.S. Pat. No. 4,097,435—polycarbonate molding compositions including glass fibers, and an ester wax of montanic acid as a mold release additive. Example 2 uses the stearyl ester of behenic acid.

U.S. Pat. No. 3,784,595—polycarbonate molding compositions having as a mold release additive an ester of a trihydric alcohol and a $C_{10}$ to $C_{22}$ saturated aliphatic carboxylic acid.

U.S. Pat. No. 4,065,436—polycarbonate molding compositions having as a mold release additive an ester of a saturated aliphatic carboxylic acid with 10 to 20 carbon atoms per molecule and an aromatic hydroxy compound with from 1 to 6 hydroxyl groups.

U.S. Pat. No. 4,131,575—polycarbonate molding compositions having as a mold release additive an ester of a saturated aliphatic carboxylic acid with 10 to 20 carbon atoms and 4-hydric to 6-hydric alcohols.

Japanese No. 72 41,092—mold release agents are esters from $C_{12-30}$ aliphatic monocarboxylic acids and mono or polyhydroxy aliphatic saturated alcohol. Butyl stearate is a specific example. Stearnic acid is also employed in combination with polycarbonate.

U.S. Pat. No. 3,186,961—discloses many esters which can be used in polycarbonate as plasticizers.

U.S. Pat. No. 4,082,715—discloses use of esters in polycarbonate and shows the plasticizing ability of various esters.

Japanese Nos. 79 76,651; 79 16,559; and 80 84,353—all of these laid open patent applications disclose polycarbonate or polyestercarbonate with paraffin waxes.

SUMMARY OF THE INVENTION

In accordance with this invention, there is a composition comprising a thermoplastic resin in combination with a mold release effective amount of a mold release agent and a mold release enhancing effective amount of a saturated or unsaturated normal fatty acid having from about fourteen (14) to about thirty-six (36) carbon atoms, inclusive, which is insufficient to cause appeciable degradation of the polymer during normal processing and use.

Examples of various thermoplastic resins which are within the invention include polycarbonates, polyesters, polysulfones, polyethersulfones, polyamides, polysulfides, polyacrylates, polyurethanes, polyolefins, polyvinylhalides, acrylonitrile butadiene styrene, butadiene styrenes, methacrylate butadiene styrenes and the like and blends of the above with each other or a further thermoplastic resin. The preferred thermoplastic resin is an aromatic polycarbonate.

Aromatic polycarbonates are prepared in the conventional manner by reacting a dihydric phenol with a carbonate precursor in an interfacial polymerization process. Typical of some of the dihydric phenols that may be employed in the practice of this invention are bisphenol-A, (2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxyphenyl)methane, bis 4-hydroxy phenyl sulfone and bis 4-hydroxy phenyl sulfide. Other dihydric phenols of the bisphenol type are also available and are disclosed in U.S. Pat. Nos. 2,999,835; 3,028,365 and 3,334,154. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates such as di(chlorophenyl)carbonate, di-(bromophenyl)carbonate, di(trichlorophenyl)carbonate, di-(tribromophenyl)carbonate, etc., di-(alkylphenyl)carbonate such as di(tolyl)carbonate, etc., di-(naphthyl)carbonate, di-(chloronaphthyl)carbonate, phenyl tolyl carbonate, chlorophenyl chloronaphthyl carbonate, etc., or mixtures thereof. The haloformates suitable for use herein include bis-haloformates of dihydric phenols (bis-chloroformates of hydroquinone), or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bi-carbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethylammonium bromide, tetra-n-heptylammonium iodide, tetra-n-propylammonium bromide, tetra-methylammonium chloride, tetra-methylammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl or mixtures thereof. Examples of these poly-functional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polymer and a branched polymer.

Within the definition of polycarbonate are also copolyester-carbonates, that is the polymer made from a dihydric phenol, a dibasic acid and a phosgene precursor. U.S. Pat. No. 3,169,121 covering copolyester-carbonates and methods of preparing them is hereby incorporated by reference.

The method of preparing the thermoplastic resins other than the aromatic polycarbonates are equally well known, consequently no detailed procedures of preparation are necessary.

With respect to mold release agents, any mold release agent which can be employed with the thermoplastic resins and are compatible therewith, particularly aromatic polycarbonates, can be employed. Examples of these mold release agents include, inter alia, various esters and paraffin waxes as identified in earlier cited references, particularly Japanese No. 72 41,092; Japanese No. 79 76,651; Japanese No. 80 84,353; Japanese No. 79 16,559; U.S. Pat. No. 3,836,499; U.S. Pat. No. 4,097,435; U.S. Pat. No. 3,784,595; U.S. Pat. No. 4,065,436; and U.S. Pat. No. 4,131,575. The quantities are any of the usual quantities which will bring about effective mold release as compared to a control without the mold release agent.

It has been found that the addition of saturated and unsaturated normal fatty acids having from about fourteen (14) to about thirty-six (36) carbon atoms, inclusive, enhance the mold release capability of the other agents. Examples of the saturated acids include myristic, palmitic, stearic, arachidic, behenic and hexatrieisocontanoic (C36) acids. Examples of the unsaturated acids are palmitoleic, oleic, linolenic and cetoleic. Saturated acids are preferred. The most preferred acids are arachidic and behenic.

Any amount of fatty acid which enhances the mold release capabilities of the mold release agent can be employed. However, the quantity of fatty acid should be insufficient to cause appreciable degradation of the polymer during normal processing and use. For example, the intrinsic viscosity and melt index should show little difference with and without the fatty acid after normal processing steps familiar to those skilled in the art. Generally, relatively small quantities of acid are effective mold release enhancers when present with another mold release agent. Quantities of from about 0.001 to about 0.3 weight percent, based on the quantity of resin present in the composition can be employed. Higher quantities of fatty acid can be employed; however, no advantage in mold release enhancement is usually observed and some degradation under severe high temperature conditions is possible. Preferred quantities of fatty acid are from about 0.01 to about 0.075 percent. The acid can be added to the resin in the normal manner that the other additives are added, for example, in the dry stage and coextruded or in a solvent and melt extruded with the resin.

Other additives in common use in the thermoplastic resins may also be employed. For example with respect to aromatic polycarbonate, additives which are commonly known to stabilize the resin thermally such as a phosphite can be employed. Hydrolytic stabilizers such as epoxides may also be employed as well as agents which are flame retardants, drip inhibitors, ductility enhancer, anti-oxidant, solvent resistance enhancer, ultraviolet light stabilizers and various inert fillers. Active fillers and pigments can be used with passivating agents and treatments.

Below are specific examples of the invention. The examples are intended to illustrate but not narrow the inventive concept. All percentages of the additives are in weight percent of the thermoplastic resin.

EXAMPLE 1

In all the ensuing examples the aromatic polycarbonate is Lexan®140, a polymer produced by reacting bisphenol-A and phosgene.

The mold used was a 3"×3" box with a 1½" wall height. It had ejector pins at four corners with two of the pins being attached to strain gauge transducers for measuring the part ejection pressure. The mold was designed with very little draft so that the part would tend to stick to the core unless mold release is used. To vary the amount of shrinkage on the core, the temperature of the stationary and moving mold halves could be varied.

The polycarbonate and the mold release agent(s) were dry formulated, blended and extruded at 260° C. with additive quantities of thermal stabilizer and pigment, unless otherwise noted.

As used in the Table below, PETS is the commercially employed mold release agent, pentaerythritol tetrastearate, purchased from Hercules, used as a control.

Hystrene 9022 is a combination of $C_{20}$ and $C_{22}$ fatty acids available from Humko.

Kemester 9022 is methyl behenate available from Humko.

Ricewax is a paraffin wax available from Will & Baumer Candle Co. with a melting point of about 53°–55° C.

Examples 1 through 4 are compositions having a pigment providing a green semi-translucent color.

Examples 5 and 6 are compositions having a pigment providing a solar gray semi-transparent color and also a small quantity of a flame retardant.

Examples 7, 8 and 9 do not have any pigment present.

Below in Table I are the molding trial results.

TABLE I

| EXAMPLE | MOLD RELEASE AGENT (S) AND QUANTITY (WT. PERCENT) | EJECTOR PIN PRESSURE psi ±2o | |
|---|---|---|---|
| | | PEN #1 | PEN #2 |
| 1 | PETS 0.3 (Control) | 8,580 ± 359 | 3,310 ± 122 |
| 2 | PETS 0.3 and Hystrene 9022 0.1 | 4,815 ± 67 | 1,690 ± 63 |
| 3 | Kemester 9022 0.3 | 5,595 ± 119 | 1,905 ± 57 |
| 4 | Kemester 9022 0.3 and Hystrene 9022 0.05 | 4,815 ± 67 | 1,690 ± 63 |
| 5 | Kemester 9022 0.3 | 5,035 ± 188 | 1,705 ± 73 |
| 6 | Kemester 9022 0.3 and Hystrene 9022 0.05 | 4,370 ± 236 | 1,495 ± 99 |
| 7 | Ricewax 0.3 | 6,975 ± 413 | 2,460 ± 112 |
| 8 | Ricewax 0.3 and Stearic Acid 0.03 | 4,057 ± 400 | 1,250 ± 162 |
| 9 | Ricewax 0.3 and Stearic Acid 0.2 | 3,710 ± 208 | 1,390 ± 197 |

The data in the above table demonstrate the mold release enhancing properties of a fatty acid when applied to various esters and a paraffin wax. A comparison of Examples 5–6 with 3–4 show the results of a change of pigment and the addition of a flame retardant agent. A comparison of Example 8 with Example 9 shows that a plateau effect of the fatty acid is achieved with relatively low concentration of the fatty acid when used in conjunction with another mold release agent.

What is claimed is:

1. A composition which comprises a thermoplastic resin selected from the group consisting of aromatic polycarbonates, polyesters, polysulfones, polyethersulfones, polyamides, polysulfides, polyacrylates, acrylonitrile butadiene styrene, butadiene styrene, methacrylate butadiene and blends thereof and a mold release effective amount of a mold release agent and a mold release enhancing effective amount of a saturated or unsaturated normal fatty acid having from about fourteen (14) to about thirty-six (36) carbon atoms, inclusive which is insufficient to cause appreciable degradation of the polymer during normal processing and use.

2. A composition in accordance with claim 1 wherein the thermoplastic resin is an aromatic polycarbonate.

3. A composition in accordance with claim 2 wherein the mold release agent is an ester or a paraffin wax.

4. A composition in accordance with claim 2 wherein the fatty acid is present in quantities of from about 0.001 to about 0.3 weight percent of the resin in the composition.

5. A composition in accordance with claim 4 wherein the said weight percent is from about 0.01 to about 0.075.

6. A composition in accordance with claim 2 wherein an effective amount of an ultra violet stabilizer is present.

7. A composition in accordance with claim 2 wherein an effective amount of a flame retardant is present.

8. A composition in accordance with claim 2 wherein an effective amount of a hydrolytic stabilizer is present.

9. A composition in accordance with claim 2 wherein an effective amount of a drip inhibitor is present.

10. A composition in accordance with claim 2 wherein an effective amount of a thermal stabilizer is present.

11. A composition in accordance with claim 2 wherein an effective amount of an active filler is present.

12. A composition in accordance with claim 2 wherein an effective amount of a pigment is present.

13. A composition in accordance with claim 1 wherein the thermoplastic resin is polyesters, polysulfones, polyethersulfones, polyamides, polysulfides, polyacrylates, acrylonitrile butadiene styrene, butadiene styrene, methacrylate butadiene and blends thereof wherein the fatty acid is present in quantities of from about 0.001 to 0.3 weight percent of the resin in the composition.

14. A composition in accordance with claim 13 wherein the said weight percent is from about 0.01 to about 0.075.

15. A composition in accordance with claim 5 wherein the mold release agent is an ester.

16. A composition in accordance with claim 14 wherein the mold release agent is an ester.

17. A composition in accordance with claim 4 wherein the fatty acid is present in quantities of from about 0.001 to about 0.03 weight percent.

18. A composition in accordance with claim 5 wherein the fatty acid is present in from about 0.03 to about 0.075 weight percent.

* * * * *